United States Patent

Davis

[15] 3,673,852
[45] July 4, 1972

[54] ANALYSIS OF COMMINUTED MEAT PRODUCTS

[72] Inventor: Kenneth E. Davis, Troy, Ohio
[73] Assignee: The Holart Manufacturing Company, Troy, Ohio
[22] Filed: April 16, 1970
[21] Appl. No.: 29,278

[52] U.S. Cl. ..................................73/15.4, 73/76, 99/108
[51] Int. Cl. ..........................................G01n 25/02
[58] Field of Search .....................73/15.4, 76; 99/107, 108

[56] References Cited

UNITED STATES PATENTS

| | | | |
|---|---|---|---|
| 3,183,710 | 5/1965 | Spang | 73/76 |
| 2,828,623 | 4/1958 | Benedict | 73/76 |
| 2,869,360 | 1/1959 | Stein | 73/76 |
| 3,178,929 | 4/1965 | Goss | 73/76 |
| 3,360,985 | 1/1968 | Christian | 73/76 |

FOREIGN PATENTS OR APPLICATIONS 23,956  12/1965  Japan .........................................73/76

Primary Examiner—Richard C. Queisser
Assistant Examiner—Herbert Goldstein
Attorney—Marechal, Biebel, French & Bugg

[57] ABSTRACT

Rapid determination of fat in comminuted meat products, such as beef and the like, is obtained by exposing a preweighed sample to microwave energy for a period of time sufficient to achieve a relatively constant chemical analysis in the residue. During heating, a substantial portion of the fat is melted, leaves the sample and is collected, while a substantial portion of the moisture is vaporized and released directly as vapor. The sample residue, less released fat and moisture, is weighed as is the collected fat. By cooking the sample using microwave energy to the point short of decomposition of appreciable protein, fat, etc., some fat, moisture and protein and all the ash remain in the residue. Accurate determination of these components may then be calculated because the residue is at a relatively constant chemical analysis.

11 Claims, No Drawings

ANALYSIS OF COMMINUTED MEAT PRODUCTS

BACKGROUND OF THE INVENTION

This invention relates to a method for the analysis of comminuted meat products, and more particularly to an improved process for quick and accurate determination of the percentage of fat, and if desired, moisture, protein and ash in products such as beef and the like.

In meat products which are intended for human consumption and which are comminuted during processing, the problem of accurate control of fat and/or moisture content arises. Typical such meat products are ground beef, pork, veal and lamb, pork sausage and meat products such as bologna, weiners and liverwurst. The usual procedure is to feed chunk meat into a grinder and then a mixer to bring about intermixing of the meat product. It is after the mixing operation that the composition is checked and adjustments made in the fat to lean ratio and/or moisture content. Following this, the meat is then ground a second time of further processed by mixing and blending with seasoning and the like.

This invention is primarily directed to the analysis of ground beef, the composition of which may vary considerably depending on the grade of meat. For example, regular hamburger may contain between 20 and 30 percent fat, ground chuck around 15 percent, and ground round about 10 percent. By far and away the largest volume of sales is regular ground beef or hamburger meat, the very items in which the fat and moisture has the greatest possible range.

The need for accurate quick fat determination, as well as moisture, protein and ash may be more readily understood from the following comments concerning meat chemistry.

Skeletal meat includes fat whose content varies among meat components and is an independent variable. For example, approximate average percentages of fat, as determined by ether extractions, are as follows:

| | |
|---|---|
| Chuck | 10% |
| Brisket (lean sample) | 15% |
| Steer trim | 15%, 35%, 60% |
| Cow trim | 20% |
| Lamb, leg | 20% |
| Beef, flank | 20% |
| Pork, loin | 20% |
| Beef, rump | 25% |
| Pork, shoulder | 35% |
| Fresh ham, adipose tissue | 75% |

Raw fat, by present market prices varies from 4 to 6 cents per pound.

Ash, which includes calcium, phosphorus, iron, sodium, potassium, etc. represents about 1 percent of lean meat and about 0.3 percent of 30 percent lean meat. Protein and moisture constitute the balance of lean skeletal meat with the protein moisture ratio being about 3.45 for beef and 3.65 for pork.

Thus, assuming proper sampling techniques, close control of fat results in considerable savings to the packer, For example, assuming a value of 50 to 60 cents per pound for lean meat, an error of 1 percent costs ½ cent/lb, and a 2 percent error is 1 cent/lb. which for a processor of 100,000 pounds a week is over $50,000 a year.

Apart from close cost control by the processor, there is also protection of the consumer in that the amount of fat or moisture may vary in a meat product from day to day, notwithstanding the processor's good faith attempts to control these variables. In many cases of contract sales, fat content is specified and penalties imposed for exceeding the maximum amounts stated. Fat and moisture control have also been important constituents in diet control for hospitals, nursing homes and the like. Finally, it would be advantageous, both to the processor and consumer, to have each packaged comminuted meat product labeled with the percentage fat, moisture, protein and ash.

Currently, the standard determination of fat is by the official American Organization of Agricultural Chemists (AOAC) ether extraction method which takes about 16 to 24 hours. The fact is that not all fats are ether extractable, while conversely, some non-fat materials are ether extractable. Accordingly, an absolute standard does not exist. Several direct methods are used in addition to the AOAC method, as reported in "Analysis of Fats and Oils", U. C. Mehlenbacher, 1960, The Ganard Press, Champaign, Illinois. These methods are all based on chemical procedures and take anywhere from 10 minutes to as long as 16 to 24 hours.

Also used are the indirect methods such as gamma ray penetration, ultrasonics, a resistance heating method, such as U. S. Pat. No. 3,178,929; a specific gravity method, see U. S. Pat. Nos. 3,282,115 and 3,417,625, and a photocell scanning method, see U. S. Pat. No. 3,396,280.

Another method, which is rapid and effective is disclosed in U. S. Pat. No. 3,183,710 assigned to the assignee of this application. This latter method involves direct heating of a comminuted meat sample to melt the fat and to remove the moisture and fat in liquid form.

SUMMARY OF THE INVENTION

By the present invention a simple, quick and accurate method is provided for determination of the fat content of comminuted meat products especially beef. The method of the present invention also enables determination of moisture, and protein and ash, if it is desirable to measure these in addition to fat content.

The improvement of the present invention consists of exposing a sample of comminuted meat of known weight to microwave energy. By using microwave energy, water or moisture in the sample is removed directly as vapor rather than a liquid. Microwave energy operates to effect uniform treating of the sample at all points since heat is generated primarily by rotation of the water molecules in the sample. The heat thus produced "renders" or melts the fats present in the sample and which have a melting point below 212° F. The fats released as liquids are composed primarily of lard and tallow fats having a melting point in the range of 90° – 124° F. In beef these fats are organic compounds having chain lengths of 11 to 19 carbons, while in pork, the chain length is smaller, e.g., 13–19 carbons. By exposure to microwave energy, essentially all of these fats may be rendered without completely charring the original sample. Where the sample is charred, protein and ash cannot be determined accurately since some of the protein is destroyed or converted to products which are vaporized.

The fat rendered from the sample is collected and weighed while the moisture is vaporized. Thus the solid residue weight plus the weight of fat subtracted from the sample weight provides the weight of moisture vaporized from the sample. Since the solid residue is of constant chemical analysis, it is possible to calculate the percentage of fat, moisture, protein and ash. It is also possible in accordance with the present invention to obtain an indication of fat by exposing the sample to microwave energy, collecting the fat, and calculating the percentage of fat.

Accordingly, it is a primary object of the present invention to provide an improved process for the determination of the percentage of fat in a sample of comminuted meat.

Another object of the present invention is the provision of an accurate simple method for analysis of comminuted meat products by rendering a sample using microwave energy.

Another object of the present invention is the provision of a fast and accurate method for the determination of the percentage of fat, moisture, protein and ash in a comminuted meat sample.

Another object of the present invention is the use of microwave energy as a heat source in a simple process for determination of fat wherein moisture present in the comminuted meat sample is evaporated, the fat collected, the solid residue saved and weighed thus enabling calculation of the percentage of fat, and if desired moisture, protein and ash.

Another object of the present invention is the provision of a calibrating procedure for the microwave oven for determining the constant chemical analysis of various comminuted meat products and for the determination of correction factors useable in calculation of moisture and protein.

DESCRIPTION OF THE PREFERRED EMBODIMENTS

In accordance with the present invention, a sample of comminuted meat, for example beef, selected in accordance with standard well-known sampling techniques, is placed in a preweighed sample holder and the sample holder and sample are weighed. The sample and sample holder may be a simple grid element positioned over a funnel, as shown for example in U. S. Pat. No. 3,183,170. The sample holder with the sample thereon is placed in a microwave oven and a beaker positioned under the funnel so that rendered fat may be collected. Other arrangements may be used to collect rendered fat, as will be apparent to those skilled in the art.

The microwave oven may be the type using a magnetron with a frequency in the range of 900 to 2500 mHz. With an oven equipped with a source operating at 2450 mHz, a 70 gram sample is cooked in about four minutes. By "cooking" in accordance with this invention is meant heated short of charring but far too well cooked to be edible. The cooking with microwave energy offers the singular advantage of generating heat throughout the sample so that it is uniformly and evenly heated. The energy from the source penetrates the sample causing rotation of the dipolar molecules, such as water, thereby generating heat uniformly through the sample. The heat generated is sufficient to liquify normally solid fats, i.e., those having a melting point below 212° F, which then drips from the sample into the collection beaker. The moisture, or water is vaporized and released directly as vapor. By heating the sample short of charring, decomposition of substantial amounts of protein and fat is avoided even though some fat, moisture, and protein and ash remain in the solid residue.

One of the important discoveries in accordance with the present invention is that by microwave cooking the samples may be cooked to a relatively constant chemical analysis, i.e., a steady state condition in which the relative percentages of protein, moisture, fat and ash in each sample is the same from sample to sample for the same oven design. It is for this reason that the samples are "cooked" to short of charring. By way of example, the residue in the case of beef contains about 70–71 percent protein, 2–3 percent moisture, 2–3 percent ash, and 23–24 percent fat.

The microwave cooking thus does not remove all of the fat or moisture, but this has been found not to be critical to the determination of the percentages of these components in accordance with the present invention. It has also been observed that some of the protein is removed with the moisture by decomposition and vaporization. Most important is the discovery that the steady state residue percentages and the amount of protein vaporized with the moisture are functions of oven design, i.e., spacing between the microwave energy source and sample, intensity of energy source, and rate of heating and type of meat. Also a factor is the loss of fat, protein, etc., due to spattering and the vaporization of some of these components. Thus, any microwave oven will have a set of constants which can be calculated for practicing the present invention, the constants being determined easily by a simple calibration procedure, and being valid for each oven of the same design, although it may vary from one design of oven to the next. The procedure for developing such constants will be discussed below.

Following the rendering operation, the collected liquid fat is weighed and the solid residue is also weighed. These data and the constants may be used to calculate the percentage of fat, or the percentage of fat, moisture, protein and ash, although the constants are needed only for the calculation of moisture and protein.

A typical example of the procedure of the present invention is as follows:

| | |
|---|---|
| Sample and sample holder weight | 301.8 grams |
| Sample holder weight | 230.6 grams |
| Weight of sample | 71.2 grams |

The sample was heated for about four minutes by microwave energy, as described above. As a general rule the duration of heating varies with the sample weight and between three to five seconds per gram of sample is sufficient to "render" short of charring. During heating, moisture was vaporized taking with it a slight amount of protein. The fat which was melted is collected.

The rendered sample was weighed to provide the following:

| | |
|---|---|
| Sample holder and sample | 301.8 grams |
| Dehydrated sample weight (plus sample holder and fat) | 252.4 grams |
| Loss in weight-moisture | 49.4 grams |
| Solids residue weight less fat | 18.0 grams |

Solids Residue Analysis

| | |
|---|---|
| Protein | 70.93% |
| Moisture | 2.86% |
| Fat | 23.59% |
| Ash | 2.44% |
| Total: | 99.82% |

From these data, the percentage of fat, may be calculated directly while the percentage of moisture and protein may be calculated using a correction factor which compensates for the amount of protein released with moisture and the amount of moisture. Due to the vaporization of a small amount of protein, the recorded weights would indicate a smaller percentage of protein than is actually present and a corresponding greater amount of moisture than is actually present. The formulae and calculations are as follows:

Sample weight

1. Percentage fat = 100 × [(Fraction of fat in solid residue × residue weight) + dehydrated sample weight, (sample holder weight + solids residue)].
2. Percentage ash = 100 × [Fraction of ash in solid residue × solids residue weight].
3. Percentage protein = 100 × [Fraction of protein in solid × solids residue weight] plus correction factor.
4. Percentage moisture = 100 × [Fraction of moisture in solid residue × residue weight plus loss in weight], correction factor.

Using the above formulas and data the following percentages were calculated:

$$(1) \quad \text{Percentage fat} = \frac{100 \; [(0.236 \times 18) + 252.4 - (230.6 + 18)]}{71.2} = 11.31\%$$

$$(2) \quad \text{Percentage ash} = \frac{100 \; (0.024 \times 18)}{71.2} = 0.61$$

$$(3) \quad \text{Percentage protein} = \frac{100 \; [(0.709 \times 18) + 2.02]}{71.2} = 19.94$$

$$(4) \quad \text{Percentage moisture} = \frac{100 \; [(0.029 \times 18) + 49.4]}{71.2} - 2.02 = 68.06$$

As noted above, due to the loss of protein, the amount of which is a function of the oven design sample holder, etc., as noticed previously, a calculated correction factor of 2.02 was added to compensate for the loss of protein and subtracted from the moisture since the loss in weight of the sample is greater by 2.02 than the loss in weight due solely to vaporization of moisture.

Solid residues, rendered by microwave cooking for a period of time sufficient to produce a well cooked but not charred sample, was analyzed for a constant percentage residue. Four different samples of different fat and moisture constant were prepared and exposed to microwave heating and produced the following data for the solid residue content:

| | Protein | Moisture | Fat | Ash |
|---|---|---|---|---|
| (A) | 72.02% | 4.26% | 22.17% | 2.37% |
| (B) | 70.12% | 2.79% | 24.07% | 2.46% |
| (C) | 70.03% | 1.84% | 24.06% | 2.43% |
| (D) | 71.56% | 2.56% | 24.06% | 2.49% |

Average 70.93% 2.86% 23.59% 2.44%

These average figures for the constant percentage of the respective materials in the solid residue of comminuted beef were used for the fraction of the component remaining in each such sample following the rendering by microwave energy. Thus, for approximately the same cooking conditions, e.g., oven design, sample weight, cooking time, comminuted beef will reach a steady state condition in which the fraction of the residue is the same from sample to sample. In other words, the more fat and/or moisture present in the sample, the more the microwave cooking will remove until a constant or steady state residual analysis is reached.

To determine the accuracy of the system of the present invention, control samples of comminuted beef were analyzed by an independent research laboratory using methods approved by the American Organization of Agricultural Chemists (AOAC). The data is as follows:

| Sample | Protein % | Moisture % | Fat% | Ash% |
|---|---|---|---|---|
| 1 | 19.86 | 69.62 | 10.22 | 0.30 |
| 2 | 18.65 | 66.83 | 13.95 | 0.57 |
| 3 | 17.47 | 62.88 | 18.92 | 0.73 |
| 4 | 17.08 | 58.68 | 23.87 | 0.37 |

The same meat samples were then analyzed using the system of the present invention, and the following data was obtained:

| Sample | Protein % | Moisture % | Fat % | Ash % |
|---|---|---|---|---|
| 1a | 19.96 | 68.08 | 11.31 | 0.65 |
| 2a | 19.08 | 66.08 | 13.95 | 0.89 |
| 3a | 17.73 | 62.97 | 18.72 | 0.58 |
| 4a | 16.30 | 59.04 | 24.07 | 0.59 |

While there is generally good correspondence between the data, indicating reliability of the system of the present invention compared to the AOAC methods, the differences between the two sets of data, which are relatively small, may be due in part to minor experimental error in each system and/or the fact that the corresponding pairs of samples differed in composition. The latter reason is believed to be responsible in large measure for the difference and is understood readily if it is considered that the composition of beef varies widely depending on the cut, and the errors present in the sampling techniques. It is difficult, if not impossible, with conventional commercial grades of ground beef prepared in the usual manner to assure absolute uniform composition of comminuted products throughout the entire mass because of the relatively large size of the comminuted products.

As mentioned earlier, one aspect of the present invention is the discovery that comminuted samples, e.g., beef and the like, can be exposed to microwave energy and, if cooked short of charring, reaches a steady state condition. The composition of the steady state condition may vary due to oven design, but once oven design is eliminated as a variable, the composition for each type of meat product should be constant. Moreover, for a fixed oven design it is relatively simple to arrive at the constants which compensate for the protein which is vaporized with the moisture.

Thus, once an oven design is arrived at, the sample holder is positioned the same distance from the microwave source as in actual use of the oven. A prepared sample, carefully compounded to produce as uniform a consistency as possible in then used for calibration of the oven as follows:

A portion of the sample is exposed to microwave energy for a period of time equal to about 3 to 5 seconds per gram of sample. The fat is collected and weighed as is the solid rendered residue. The solid residue is then analyzed using AOAC procedures to determine residual fat, protein, moisture and ash. The remaining uncooked portion of the sample is also analyzed using AOAC procedures for the percentage of fat, moisture, protein and ash.

Using the data from the cooked samples, the percentage of moisture, fat, protein and ash are calculated using the formulas previously given. The calculated percentages of the various components is checked against the percentages obtained by analysis. From this comparison, a correction factor is obtained which is added to the calculated percentage of protein to compensate for the amount vaporized with moisture, and subtracted from the calculated amount of moisture which is high by the same corresponding amount. The percentage of fat and ash should correspond closely without any correction factor.

Thus, the present invention easily permits calculation of fat, ash, and if desired, protein and moisture. The procedure effects separation of water and fat by vaporizing the water and rendering the fat. Moreover, the combination of data is accurate thereby indicating reliability if proper procedures are followed.

By using the above calibration procedure, and to the extent that the correction factor is different for different types of comminuted meat products, i.e., beef versus veal, or beef versus chicken, correction factors for each type of meat products are easily developed for each oven design and remain the same for each oven. Also, the analysis of the solid residue remains the same for each type of meat because the cooked sample, in accordance with the present invention, achieves a steady state condition permitting easy calculation of percentage of components once the oven has been calibrated.

It will also be apparent to those skilled in the art that percentage fat may be determined directly by completely cooking the residue to a state corresponding to a charred condition. Cooking to a charred condition effects release of all of the fat in the sample, which is collected and weighed, and also volatilizes all the moisture in the sample. Thus, separation of moisture and fat is not necessary, and knowledge of solid residue analysis or a correction factor is obviated. By this method, the percentage fat is easily calculated directly by knowing the weight of collected fat and the weight of the original sample.

It is to be understood, however, that where analysis of protein, moisture and ash are also desired, in addition to fat, the procedure previously described may be used. Although dielectric heating is described with reference to microwave energy, it will be understood by those skilled in the art that other forms of high frequency energy may be utilized to effect dielectric heating.

While the methods of the apparatus herein described constitute a preferred embodiment of the invention, it is to be understood that the invention is not limited to these precise methods, and that changes may be made therein without departing from the scope of the invention which is defined in the appended claims.

What is claimed is:

1. A process for the determination of fat content of edible comminuted meat products comprising the steps of providing a sample of known weight, the weight of said sample being the same or variable for each determination of fat content, exposing said sample to microwave energy for a predetermined period of time sufficient to render the fat and moisture and to provide a residue cooked short of charring and of substantially known constant chemical analysis, said microwave energy being operative to effect release of said moisture directly as vapor and said melted fat being released as liquid, collecting said melted fat rendered from said sample, and determining the percentage of fat in the original sample as the sum of collected melted fat and the constant percentage of fat remaining in the cooked residue.

2. A process as set forth in claim 1 wherein said microwave energy is in the range of 900 mHz to about 2500 mHz.

3. A process as set forth in claim 1 wherein the percentage of moisture is determined as a function of the constant amount of moisture in the residue, the amount of moisture liberated less the amount of protein released with the liberated moisture.

4. A process as set forth in claim 3 wherein the percentage of protein is determined as a function of the constant percentage of protein in the residue plus the amount of protein liberated with the moisture.

5. A process as set forth in claim 1 wherein the actual percentage of ash is the sum of the constant percentage of ash in the residue.

6. A process as set forth in claim 1 wherein said comminuted meat product is comminuted beef.

7. A process as set forth in claim 1 wherein said comminuted meat product is beef and wherein the substantially constant chemical analysis of said cooked residue is approximately between 2 and 3 percent moisture, between 70 and 71 percent protein, between 23 and 24 percent fat, and between 2 and 3 percent ash.

8. A process as set forth in claim 1 wherein said predetermined period is in the range of 2 to 5 seconds for each gram of sample weight.

9. A process for the determination of fat content of edible comminuted meat products comprising the steps of providing a sample of known weight, the weight of said sample being the same or different for each determination of fat content, exposing said sample to microwave energy to heat said sample uniformly for the rendering of fat and moisture, said microwave energy being operative to effect release of said moisture directly as vapor and to release said fat as a liquid, said exposing step being for a length of time sufficient to render as a liquid all of the fat in said sample having a molecular chain length of about 19 carbons and less and to char said sample, collecting said released liquid fat, and determining the percentage of fat in the sample as a function of the weight of the collected fat and the weight of the sample.

10. A process for the calibration of a microwave oven for use in rendering a comminuted meat sample for determination of the content of fat, moisture, protein, or ash, or combinations thereof, comprising the steps of preparing a sample of comminuted meat product of substantially uniform composition, introducing a preweighed portion of said sample of said meat product into said oven and heating for a predetermined period of time short of charring to achieve a steady state condition in which the residual percentage of fat, moisture, protein and ash in said sample residue remains constant, said heating step being operative to render some of the fat in said sample and to varporize some of said moisture and a portion of the protein in said sample, and analyzing said solid residue for the percentage of fat, moisture, protein and ash therein to determine the relative amounts thereof in said solid residue, said percentages being the same from sample to sample and whereby the percentage of fat in the solid residue and the percentage of rendered fat may be used in determining the amount of fat in a sample.

11. A process as set forth in claim 10 further including the steps of determining the percentage of protein in said sample from the percentage of protein in said solid residue, determining the percentage of moisture in said sample from the percentage of moisture in said solid residue and the loss in weight of said sample due to release of moisture therefrom, analyzing an uncooked portion of said sample to determine the percentage of moisture and protein therein to provide a correction factor for use in subsequent determination of the percentage of protein and moisture in a meat sample rendered by a microwave oven of essentially the same design of the calibrating oven.

* * * * *